United States Patent
Miyajima et al.

(10) Patent No.: US 9,587,999 B2
(45) Date of Patent: Mar. 7, 2017

(54) DEVICE FOR MEASURING STATE OF CONTACT OF SUPPORT ROLLER OF CONVEYOR BELT

(71) Applicant: The Yokohama Rubber Co., LTD., Minato-ku, Tokyo (JP)

(72) Inventors: Atsushi Miyajima, Hiratsuka (JP); Osamu Ozawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/890,039

(22) PCT Filed: May 7, 2014

(86) PCT No.: PCT/JP2014/062244
§ 371 (c)(1),
(2) Date: Nov. 9, 2015

(87) PCT Pub. No.: WO2014/181794
PCT Pub. Date: Nov. 13, 2014

(65) Prior Publication Data
US 2016/0076955 A1    Mar. 17, 2016

(30) Foreign Application Priority Data
May 10, 2013   (JP) .................. 2013-100247

(51) Int. Cl.
*G01D 7/00*   (2006.01)
*G01L 5/16*   (2006.01)
*B65G 43/02*   (2006.01)

(52) U.S. Cl.
CPC ............... *G01L 5/16* (2013.01); *B65G 43/02* (2013.01); *B65G 2207/48* (2013.01)

(58) Field of Classification Search
CPC .. B65G 43/02; B65G 2207/48; A63B 2225/50
(Continued)

(56) References Cited

U.S. PATENT DOCUMENTS 6,321,586 B1 * 11/2001 Wojtowicz ............... G01N 3/56
73/9
2003/0108633 A1 * 6/2003 Yamakawa ............... D04H 3/14
425/72.2

(Continued)

FOREIGN PATENT DOCUMENTS

| JP | 2006-292736 | 10/2006 |
| JP | 2008-275539 | 11/2008 |

(Continued)

OTHER PUBLICATIONS

International Search Report for International Application No. PCT/JP2014/062244 dated Aug. 12, 2014, 4 pages, Japan.

*Primary Examiner* — Max Noori
(74) *Attorney, Agent, or Firm* — Thorpe North & Western

(57) ABSTRACT

A device for measuring the state of contact of a measuring roller of a conveyor belt includes a pressure sensor provided on a rotating surface of the measuring roller, which rotates in contact with an inner peripheral surface of a conveyor belt stretched between pulleys. The pressure sensor detects resistance force acting when the conveyor belt rides over the measuring roller. A rotational position sensor detects the circumferential position, on the rotating surface, of the pressure sensor. The data detected are sequentially wirelessly transmitted to the outside of the measuring roller by a transmission unit installed on the measuring roller, and the transmitted detection data are received by a receiver.

12 Claims, 5 Drawing Sheets

(58) Field of Classification Search
USPC .................................. 73/159, 160, 862.046
See application file for complete search history.

(56) References Cited

U.S. PATENT DOCUMENTS

| | | | |
|---|---|---|---|
| 2011/0227275 A1* | 9/2011 | Poh ..................... | B65H 3/047 271/18.1 |
| 2015/0241332 A1* | 8/2015 | Amano .................. | G01N 19/02 73/9 |

FOREIGN PATENT DOCUMENTS

| | | |
|---|---|---|
| JP | 2009-103595 | 5/2009 |
| JP | 2011-051704 | 3/2011 |

\* cited by examiner

DEVICE FOR MEASURING STATE OF CONTACT OF SUPPORT ROLLER OF CONVEYOR BELT

TECHNICAL FIELD

The present technology relates to a device for measuring a state of contact of a support roller of a conveyor belt; and particularly relates to a device for measuring a state of contact of a support roller of a conveyor belt which can precisely detect how a support roller is in contact with a conveyor belt during the traveling of the conveyor belt.

BACKGROUND

It is known that the power consumed by driving a conveyor belt changes influenced by the type of conveyor belt or peripheral equipment such as driving rollers as well as changes in the weight of transportation articles placed on the conveyor belt, or the like. Since the number of support rollers which support the conveyor belt increases when the belt conveyor has a long length, motive power loss caused by contact between the conveyor belt and the support rollers is predominant in terms of the power consumption. Therefore, reducing the motive power loss which occurs when the conveyor belt rides over the support rollers, that is, reducing the resistance force for riding over the support rollers, is an important issue.

As a part of detecting the resistance force for riding over support rollers, a device has been proposed which measures strain generated in the surfaces of the support rollers during the traveling of the conveyor belt (refer to Japanese Unexamined Patent Application Publication No. 2006-292736A). In the measuring device described in Japanese Unexamined Patent Application Publication No. 2006-292736A, the strain generated in the surfaces of the support rollers is measured by employing a conveyor belt cut to a predetermined length. Specifically, cantilevered beam-shaped notches are provided in the rotating surfaces of the support rollers and strain gauges are installed in the notches. Then, by setting the cut conveyor belt to a state of being fixed at a predetermined position, the support rollers are made to roll by moving the support rollers in the belt longitudinal direction while in contact with the lower surface of the conveyor belt. In this configuration, the detection data from the strain gauges is input to a measuring instrument through cords.

By analyzing the detection data from the strain gauges, it is possible to detect the contact state between the support rollers and the conveyor belt. However, with this measuring device, it is difficult to acquire data under conditions identical to the conditions under which the conveyor belt is used in practice. Therefore, there is a disadvantage in terms of precisely detecting the contact state between the support rollers and the conveyor belt that conforms to actual use. In addition, since the device has a structure in which the detection data from the strain gauge is input to the measuring instrument through cords, when trying to carry out measurement by setting the measurement device on the conveyor belt mounted on the actual device, there is a problem in that it is not possible to perform the measurement due to the cords extending from the strain gauges getting in the way.

SUMMARY

The present technology provides a device for measuring the state of contact of a support roller of a conveyor belt which can precisely detect how the support roller is in contact with the conveyor belt during the traveling of the conveyor belt.

A device for measuring the state of contact of a support roller of a conveyor belt of the present technology includes a measuring roller which rotates in contact with an inner peripheral surface of a conveyor belt stretched between pulleys, a pressure sensor provided on a rotating surface of the measuring roller, a rotational position sensor detecting a circumferential position of the pressure sensor on the rotating surface, a transmission unit installed in the measuring roller and sequentially wirelessly transmitting detection data from the rotational position sensor and the pressure sensor outside of the measuring roller, and a receiver receiving the detection data transmitted by the transmission unit.

In accordance with the present technology, the pressure acting on the measuring roller when rotating in contact with the inner peripheral surface of the conveyor belt, that is, the resistance force when the conveyor belt rides over the measuring roller, is detected by the pressure sensor provided on the rotating surface of the measuring roller. Then, the circumferential position of the pressure sensor on the rotating surface is detected by the rotational position sensor. By analyzing the detection data, it is possible to detect how the support roller is in contact with the conveyor belt during the traveling of the conveyor belt. Moreover, since the transmission unit installed in the measuring roller sequentially wirelessly transmits the detection data to the outside of the measuring roller to be received by the receiver, it is possible to acquire the detection data under the conditions used in practice by employing the belt conveyor which is mounted on the actual device. Therefore, it is possible to precisely detect the contact state between the support rollers and the conveyor belt, and changes in the contact state over time can also be detected.

When it is possible to precisely detect the contact state between the conveyor belt and the support rollers, the resistance force when the conveyor belt rides over the support rollers can be detected in detail. Since this contributes greatly to the development of a conveyor belt for which the necessary power consumption for driving is reduced, there is a great advantage as a measure for saving energy.

Here, for example, it is also possible to provide a power generating unit generating power using the rotation of the measuring roller and to configure the transmission unit to wirelessly transmit the detection data of the rotational position sensor and the pressure sensor employing the power generated by the power generating unit. According to this configuration, since a separate power source for wirelessly transmitting the detection data is unnecessary and power is always generated when the measuring roller rotates, wireless transmission errors caused by a lack of power can be avoided.

It is also possible to provide a plurality of the pressure sensors at intervals in the roller width direction. By arranging the pressure sensors in this manner, it is possible to detect differences in the belt width direction in the contact state between the support rollers and the conveyor belt. In addition, it is also possible to provide a plurality of the pressure sensors to be spaced in the roller circumferential direction. By arranging the pressure sensors in this manner, since the timing at which each pressure sensor detects the pressure acting on the measuring roller is different, it is easy to stagger the timing at which the detection data of each of the pressure sensors is wirelessly transmitted. Thereby, it is easy to identify and receive the detection data of each of the pressure sensors in the receiver.

It is also possible to adopt a configuration provided with a temperature sensor which detects the temperature of the inner peripheral surface of the conveyor belt when the measuring roller rotates in contact therewith. According to this configuration, it is possible to detect the temperature of the inner peripheral surface of the conveyor belt when the conveyor belt rides over the support rollers. Therefore, differences in the contact state between the support rollers and the conveyor belt due to the belt temperature can be detected.

It is also possible to provide a calculating unit calculating each of a horizontal component force and a vertical component force of the pressure acting on the measuring roller based on the detection data of the pressure sensor and the rotational position sensor. According to this configuration, the contact state between the support rollers and the conveyor belt can be detected in more detail.

BRIEF DESCRIPTION OF THE DRAWING(S)

DETAILED DESCRIPTION

Figure 1:
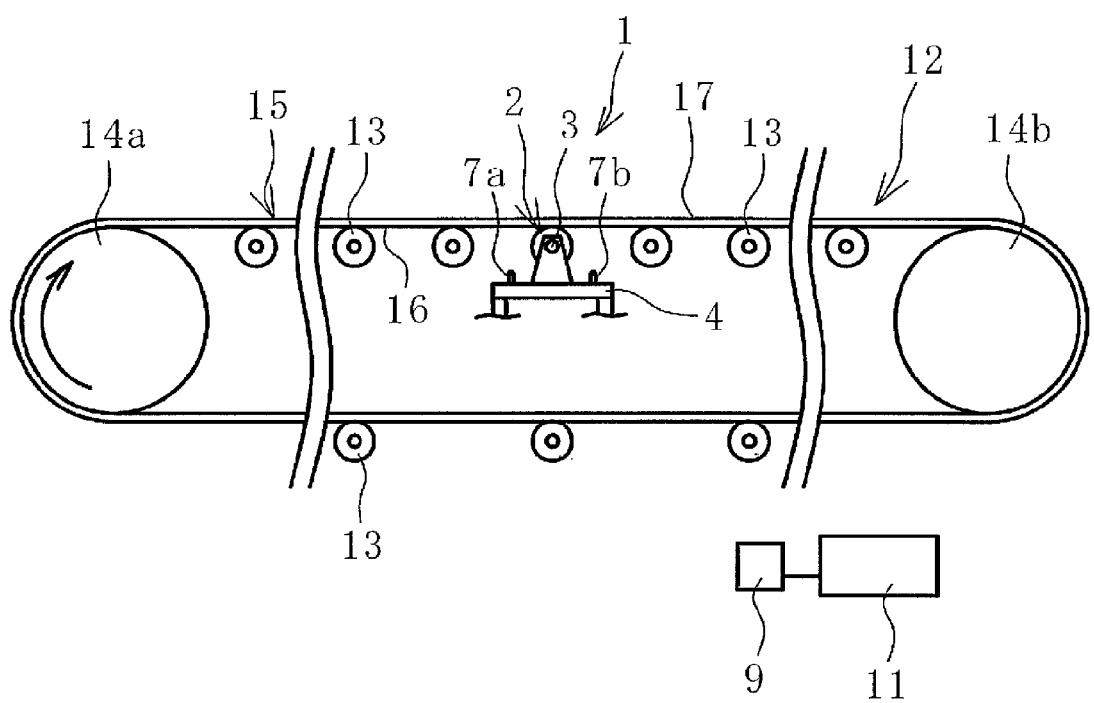
FIG. 1 is an explanatory view illustrating a device for measuring a state of contact of a support roller of a conveyor belt of the present technology in a side surface view.
Figure 2:
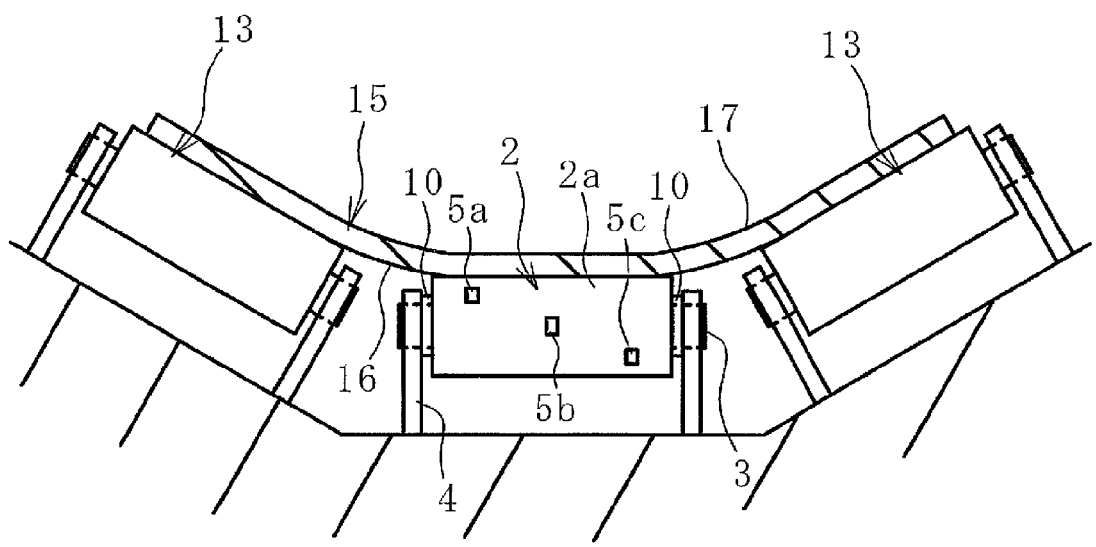
FIG. 2 is a belt width direction cross-sectional view illustrating the measuring device in FIG. 1 and the periphery thereof.
Figure 3:
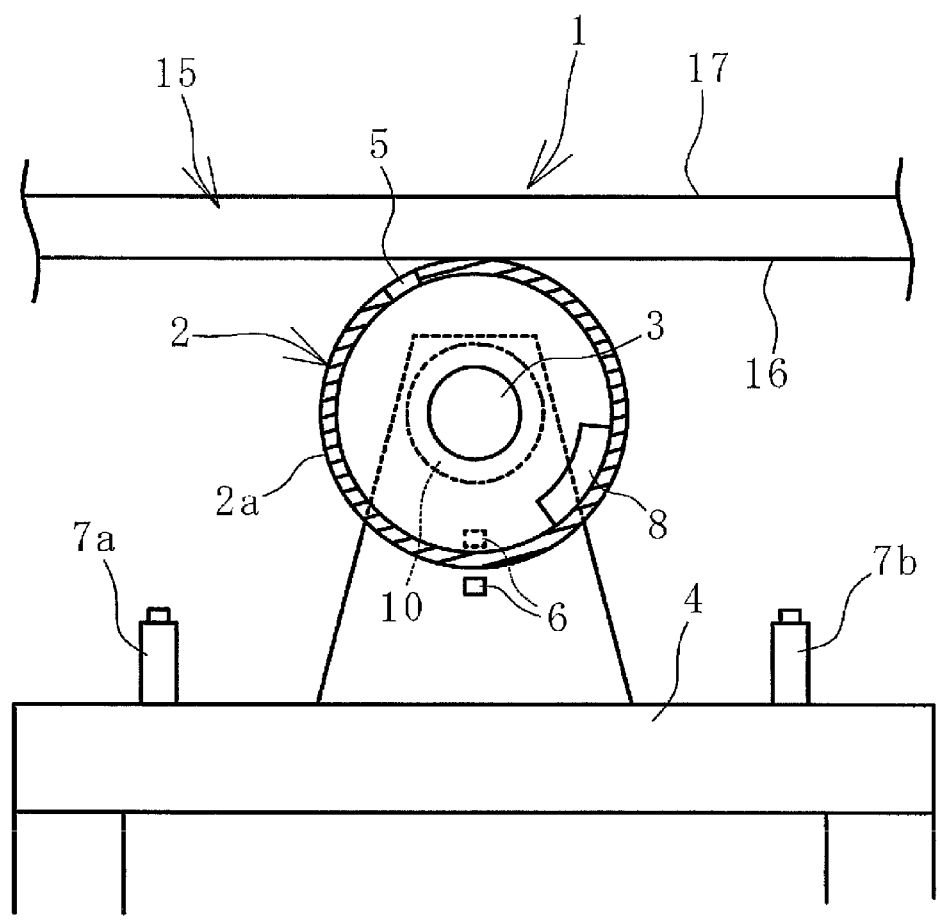
FIG. 3 is an explanatory view illustrating an internal structure of the measuring roller in FIG. 1.
Figure 4:
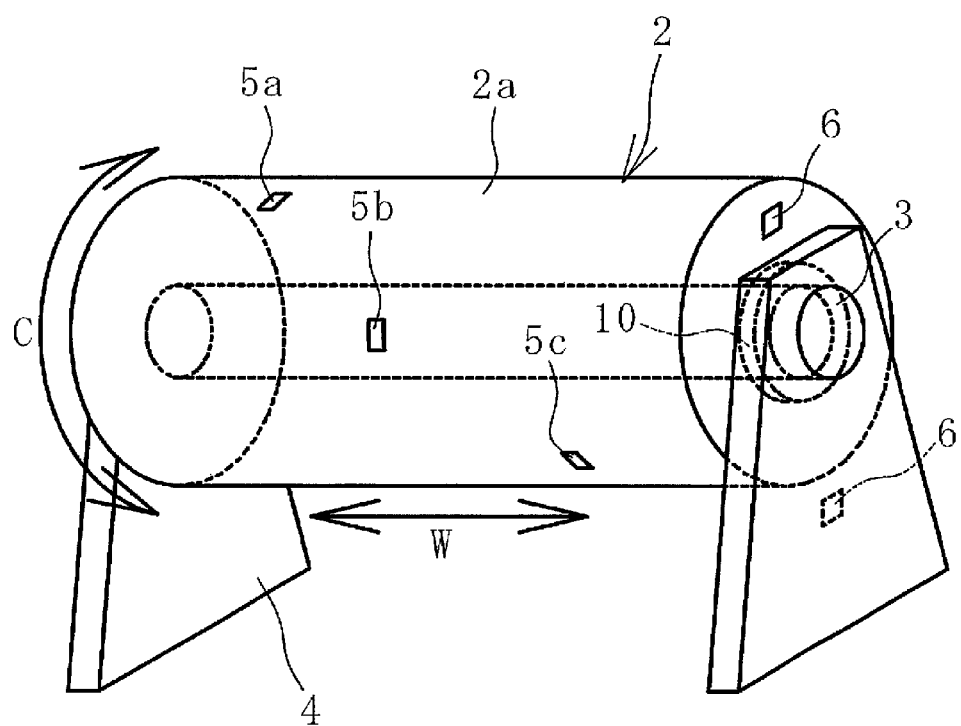
FIG. 4 is a perspective view illustrating the measuring roller in FIG. 1.

Description will be given below of the device for measuring the state of contact of a support roller of the present technology based on embodiments illustrated in the drawings.

A device 1 for measuring the state of contact of a support roller of a conveyor belt of the present technology illustrated in FIG. 1 to FIG. 4 (hereinafter, referred to as measurement device 1) is installed in a belt conveyor device 12 (the actual device) in which a conveyor belt 15 is stretched between pulleys 14a and 14b. On the carrier side of the belt conveyor device 12, multiple support rollers 13 are arranged at intervals in the belt longitudinal direction so as to contact an inner peripheral surface 16 of the conveyor belt 15. By a plurality of the support rollers 13 being arranged in the belt width direction, an outer peripheral surface 17 of the conveyor belt 15 is set to have a concave form. On the return side of the belt conveyor device 12, the support rollers 13 are appropriately arranged so as to come into contact with the outer peripheral surface 17 of the conveyor belt 15 in order to smoothly guide the conveyor belt 15.

The measurement device 1 is provided with a measuring roller 2, a pressure sensor 5 provided on a rotating surface 2a of the measuring roller 2, a rotational position sensor 6 detecting the circumferential position of the pressure sensor 5 on the rotating surface 2a, a transmission unit 8 sequentially wirelessly transmitting the detection data from the rotational position sensor 6 and the pressure sensor 5 to outside the measuring roller 2, and a receiver 9 receiving the detection data transmitted by the transmission unit 8. A calculating unit 11 such as a personal computer is connected with the receiver 9.

In the present embodiment, the measuring roller 2 is installed to replace one of the support rollers 13 provided on the carrier side of the belt conveyor device 12. It is also possible to install the measuring roller 2 additionally in the belt conveyor device 12 without replacing one of the support rollers 13. A roller with the same or equivalent specifications regarding the outer diameter and the like of the support rollers 13 is employed as the measuring roller 2. The installation position of the measuring roller 2 is not limited to the central section in the belt width direction and can also be set on an end section in the belt width direction. The measuring roller 2 is installed at a position where it is necessary to detect data.

The measuring roller 2 is pivotally supported by a central shaft 3 supported by a frame 4. Then, the measuring roller 2 rotates about the central shaft 3 by coming into contact with the inner peripheral surface 16 of the conveyor belt 15 which is traveling due to the rotating surface 2a being rotated and driven using the pulley 14a.

The number of the pressure sensors 5 to be installed may be one or a plurality. In the present embodiment, a plurality (three) of pressure sensors 5a, 5b, and 5c are provided at intervals in the roller width direction W. Furthermore, the pressure sensors 5a, 5b, and 5c are provided at intervals in the roller circumferential direction C. Each of the pressure sensors 5 detects the pressure in a direction which intersects with the rotating surface 2a (that is, in the roller radial direction) at the positions where the pressure sensors 5 are installed. In this configuration, the detection data of the pressure sensors 5 is sent to the transmission unit 8 installed in the hollow interior portion of the measuring roller 2. Here, in FIG. 4, the roller width direction is indicated by an arrow W and the roller circumferential direction is indicated by an arrow C.

As long as the rotational position sensor 6 can detect the circumferential position of the pressure sensors 5 on the rotating surface 2a, the type of sensor is not particularly limited. In the present embodiment, a pair of rotational position sensors 6, 6 is used. One of the rotational position sensors 6 is attached on one side surface of the measuring roller 2 and the other rotational position sensor 6 is attached to the frame 4 facing the one side surface. In this configuration, when the one rotational position sensor 6 is closest to the other rotational position sensor 6, the detection data (detection signal) according to the one rotational position sensor 6 is sent to the transmission unit 8. Since the positional relationship between the one rotational position sensor 6 and the pressure sensors 5 in the roller circumferential direction is known, it is possible to detect the circumferential positions of the pressure sensors 5 on the rotating surface 2a according to the detection data of the rotational position sensors 6. In addition, it is possible to detect the rotation speed of the measuring roller 2 and the traveling speed of the conveyor belt 15 according to the detection period (the time for one period) using the rotational position sensors 6.

The present embodiment is further provided with a power generating unit 10 which rotates around the central shaft 3 by being attached to the side surface of the measuring roller 2. The power generating unit 10 has a similar structure to that of a dynamo and generates power due to the measuring roller 2 rotating about the central shaft 3. The power generated by the power generating unit 10 is used when the transmission unit 8 wirelessly transmits the detection data of the rotational position sensors 6 and the pressure sensors 5 to the receiver 9.

In addition, the present embodiment is provided with non-contact type temperature sensors 7a and 7b which detect the temperature of the inner peripheral surface 16 of the conveyor belt 15 when the measuring roller 2 rotates in contact therewith. The detection data from the temperature sensors 7a and 7b is sequentially input to the calculating unit 11. The number of the temperature sensors 7a and 7b to be installed can also be one, but it is more preferable to have two. In the vicinity of a portion of the inner peripheral surface 16 of the conveyor belt 15 which comes into contact with the measuring roller 2, one temperature sensor 7a may be installed to detect the surface temperature on the traveling direction upstream side of the portion which comes into contact with the measuring roller 2 and the other temperature sensor 7b may be installed to detect the surface temperature on the traveling direction downstream side of the portion which comes into contact with the measuring roller 2.

Description will be given below of a method for detecting and measuring how the measuring roller 2 (the support rollers 13) is in contact with the traveling conveyor belt 15 employing the measurement device 1.

First, as illustrated in FIG. 1, the measuring roller 2 is set such that the rotating surface 2a thereof comes into contact with the inner peripheral surface 16 of the conveyor belt 15. That is, the measuring roller 2 is set such that the vertical initial load applied thereto is similar to that of the support rollers 13 on the periphery of the measuring roller 2. Next, the conveyor belt 15 is made to travel in this set state. Thereby, the measuring roller 2 rotates in contact with the inner peripheral surface 16 of the traveling conveyor belt 15 in the same manner as the support rollers 13.

Figure 5:
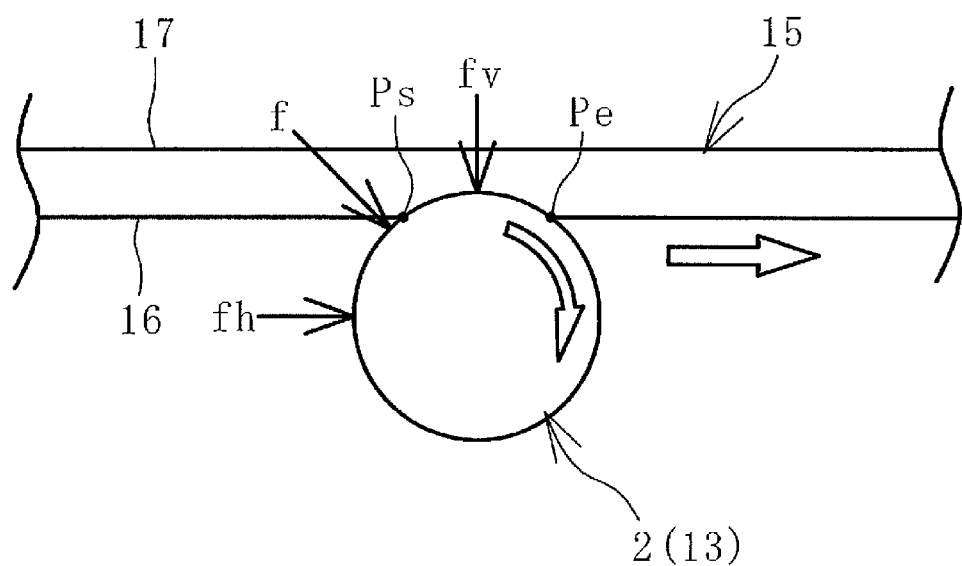
FIG. 5 is an explanatory view schematically illustrating a resistance force acting on the measuring roller (support roller).

As illustrated in FIG. 5, when the measuring roller 2 (the support rollers 13) rotates in contact with the inner peripheral surface 16 of the conveyor belt 15, a resistance force f acts obliquely downward in the belt traveling direction on the measuring roller 2 (the support rollers 13). Accordingly, when the portion of the rotating surface 2a where the pressure sensors 5 are installed rides over the conveyor belt 15, each of the pressure sensors 5 detects the pressure f in the roller radial direction at the circumferential positions thereof. This pressure f is the resistance force acting on the measuring roller 2 (the support rollers 13) and can be broken down into a horizontal component force fh and a vertical component force fv. The pressure sensors 5 detect the pressure f from a position Ps at which contact with the inner peripheral surface 16 of the conveyor belt 15 is started until the rotation reaches a position Pe at which separation from the inner peripheral surface 16 occurs. The sampling frequency at which the pressure sensors 5 detect the pressure f is, for example, approximately 2 kHz to 100 kHz.

Here, since the circumferential position of each of the pressure sensors 5 can be detected based on the detection data of the rotational position sensors 6, it is possible to detect in detail the changes in the pressure f during a period (the period from the start of the riding over to the end of the riding over) in which a position on the inner peripheral surface 16 of the conveyor belt 15 is in contact with the measuring roller 2. Since the changes in the pressure f indicate how the measuring roller 2 (the support rollers 13) is in contact with the conveyor belt 15 during the traveling of the conveyor belt 15, it is possible to detect the contact state between the support rollers 13 and the conveyor belt 15.

Then, since the transmission unit 8 installed in the measuring roller 2 sequentially wirelessly transmits the detection data from the rotational position sensors 6 and the pressure sensors 5 to the receiver 9 outside the measuring roller 2, it is possible to acquire the detection data under the conditions used in practice by employing the conveyor belt 15 mounted on the actual device. Thereby, the contact state between the measuring roller 2 (the support rollers 13) and the conveyor belt 15 can be precisely detected. In addition, it is also possible to detect a contact state which changes over time.

By analyzing the pressure f measured by the measurement device 1, that is, the resistance force for riding over the support rollers, it is possible to develop a conveyor belt with a small resistance force for riding over the support rollers which reduces the power consumption when driving the conveyor belt 15. For example, it is possible to produce a power saving type conveyor belt by improving the material of the rubber composition, the tension member, the reinforcing material, and the like or the belt structure based on the measurement results. Alternatively, by precisely detecting the power consumption when driving an existing conveyor belt, the conveyor belt can be replaced with a conveyor belt with a lower power consumption. In this manner, with the present technology, there is a great advantage in reducing the power consumption when driving a conveyor belt.

For example, based on the detection data sequentially detected by the pressure sensors 5 and the rotational position sensors 6, each of the horizontal component force fh and the vertical component force fv of the pressure f acting on the measuring roller 2 are calculated by the calculating unit 11. Then, each of the horizontal component force fh and the vertical component force fv, which are the pressure at one instant, are integrated with the time at which the pressure sensors 5 came into contact with the conveyor belt 15 during one rotation of the measuring roller 2. Thereby, it is possible to detect to what extent the horizontal resistance force and the vertical resistance force acted in total on the measuring roller 2 (the support rollers 13) in a period in which a position on the inner peripheral surface 16 of the conveyor belt 15 comes into contact with the measuring roller 2 (the support rollers 13) in one rotation of the measuring roller 2 (the support rollers 13). As a result, the contact state (the pressure distribution) between the support rollers 13 and the conveyor belt 15 can be detected in more detail.

When the power generating unit 10 generating power through the rotation of the measuring roller 2 as in the embodiment is provided, a separate power source for wirelessly transmitting the detection data from the transmission unit 8 to the receiver 9 is unnecessary. Since power is always generated when the measuring roller 2 rotates, there is also an advantage in that wireless transmission errors caused by a lack of power can be avoided.

When a plurality of the pressure sensors 5 are provided at intervals in the roller width direction W, it is possible to detect differences in the contact state between the support rollers 13 and the conveyor belt 15 in the belt width direction W. Since the outer peripheral surface 17 of the conveyor belt 15 is set to have a concave form on the carrier side of the belt conveyor device 12, the contact state is different in the belt width direction W. Therefore, there is an advantage in terms of detecting the contact state in the actual belt conveyor device 12.

When a plurality of the pressure sensors 5 are provided at intervals in the roller circumferential direction C, since the timing at which each of the pressure sensors 5a, 5b, and 5c detect the pressure f acting on the measuring roller 2 is different, the timing for wirelessly transmitting the detection data of each of the pressure sensors 5a, 5b, and 5c from the transmission unit 8 to the receiver 9 is easily staggered.

Thereby, it is easy for the receiver 9 to identify and receive the detection data of each of the pressure sensors 5a, 5b, and 5c.

If the temperature of the inner peripheral surface 16 of the conveyor belt 15 when the measuring roller 2 rotates in contact therewith is detected by providing the temperature sensors 7a and 7b, it is possible to detect the temperature of the inner peripheral surface 16 when the conveyor belt 15 rides over the measuring roller 2 (the support rollers 13). As a result, it is possible to detect differences in the contact state between the measuring roller 2 (the support rollers 13) and the conveyor belt 15 due to the belt temperature. By considering the effect of changes in temperature, there is an advantage in terms of detecting the resistance force for riding over the support rollers with high precision.

When the surface temperature of the inner peripheral surface 16 of the conveyor belt 15 is detected on the upstream side and the downstream side of the measuring roller 2 in the belt traveling direction by providing a plurality of the temperature sensors 7a and 7b as in the present embodiment, it is possible to detect in more detail changes in the temperature (hysteresis loss) of the conveyor belt 15 generated when the conveyor belt 15 rides over the measuring roller 2 (the support rollers 13). As a result, there is an increased advantage in terms of detecting the resistance force for riding over the support rollers with high precision.

What is claimed is:

1. A device for measuring a state of contact of a measuring roller of a conveyor belt, the device comprising:
    the measuring roller which rotates in contact with an inner peripheral surface of a conveyor belt stretched between pulleys;
    a pressure sensor provided on a rotating surface of the measuring roller;
    a rotational position sensor detecting a circumferential position of the pressure sensor on the rotating surface;
    a transmission unit installed in the measuring roller and sequentially wirelessly transmitting detection data from the rotational position sensor and the pressure sensor outside the measuring roller; and
    a receiver receiving the detection data transmitted by the transmission unit;
    wherein a plurality of the pressure sensors are provided, the pressure sensors being provided at intervals in a roller width direction.

2. A device for measuring a state of contact of a measuring roller of a conveyor belt, the device comprising:
    the measuring roller which rotates in contact with an inner peripheral surface of a conveyor belt stretched between pulleys;
    a pressure sensor provided on a rotating surface of the measuring roller;
    a rotational position sensor detecting a circumferential position of the pressure sensor on the rotating surface;
    a transmission unit installed in the measuring roller and sequentially wirelessly transmitting detection data from the rotational position sensor and the pressure sensor outside the measuring roller; and
    a receiver receiving the detection data transmitted by the transmission unit;
    wherein the pressure sensors are provided at intervals in a roller circumferential direction.

3. A device for measuring a state of contact of a measuring roller of a conveyor belt, the device comprising:
    the measuring roller which rotates in contact with an inner peripheral surface of a conveyor belt stretched between pulleys;
    a pressure sensor provided on a rotating surface of the measuring roller;
    a rotational position sensor detecting a circumferential position of the pressure sensor on the rotating surface;
    a transmission unit installed in the measuring roller and sequentially wirelessly transmitting detection data from the rotational position sensor and the pressure sensor outside the measuring roller;
    a receiver receiving the detection data transmitted by the transmission unit; a power generating unit generating power by rotation of the measuring roller, wherein the transmission unit wirelessly transmits detection data of the rotational position sensor and the pressure sensor employing the power generated by the power generating unit;
    wherein a plurality of the pressure sensors are provided, the pressure sensors being provided at intervals in a roller width direction.

4. The device for measuring the state of contact of the measuring roller of the conveyor belt according to claim 3, wherein the pressure sensors are provided at intervals in a roller circumferential direction.

5. The device for measuring the state of contact of the measuring roller of the conveyor belt according to claim 4, further comprising a temperature sensor detecting a temperature of the inner peripheral surface of the conveyor belt upon the measuring roller rotating in contact with the conveyor belt.

6. The device for measuring the state of contact of the measuring roller of the conveyor belt according to claim 5, further comprising a calculating unit calculating each of a horizontal component force and a vertical component force of pressure acting on the measuring roller based on detection data of the pressure sensor and the rotational position sensor.

7. A device for measuring a state of contact of a measuring roller of a conveyor belt, the device comprising:
    the measuring roller which rotates in contact with an inner peripheral surface of a conveyor belt stretched between pulleys;
    a pressure sensor provided on a rotating surface of the measuring roller;
    a rotational position sensor detecting a circumferential position of the pressure sensor on the rotating surface;
    a transmission unit installed in the measuring roller and sequentially wirelessly transmitting detection data from the rotational position sensor and the pressure sensor outside the measuring roller;
    a receiver receiving the detection data transmitted by the transmission unit; and
    a power generating unit generating power by rotation of the measuring roller, wherein the transmission unit wirelessly transmits detection data of the rotational position sensor and the pressure sensor employing the power generated by the power generating unit;
    wherein the pressure sensors are provided at intervals in a roller circumferential direction.

8. The device for measuring the state of contact of the measuring roller of the conveyor belt according to claim 1, wherein the pressure sensors are provided at intervals in a roller circumferential direction.

9. The device for measuring the state of contact of the measuring roller of the conveyor belt according to claim 1, further comprising a temperature sensor detecting a temperature of the inner peripheral surface of the conveyor belt upon the measuring roller rotating in contact with the conveyor belt.

10. The device for measuring the state of contact of the measuring roller of the conveyor belt according to claim 1, further comprising a calculating unit calculating each of a horizontal component force and a vertical component force of pressure acting on the measuring roller based on detection data of the pressure sensor and the rotational position sensor.

11. The device for measuring the state of contact of the measuring roller of the conveyor belt according to claim 2, further comprising a temperature sensor detecting a temperature of the inner peripheral surface of the conveyor belt upon the measuring roller rotating in contact with the conveyor belt.

12. The device for measuring the state of contact of the measuring roller of the conveyor belt according to claim 2, further comprising a calculating unit calculating each of a horizontal component force and a vertical component force of pressure acting on the measuring roller based on detection data of the pressure sensor and the rotational position sensor.

* * * * *